No. 756,012. PATENTED MAR. 29, 1904.
W. T. FOGAL.
PASTEURIZER.
APPLICATION FILED JUNE 24, 1903.
NO MODEL.

Witnesses:

Inventor
Wm T. Fogal,
By
Attorneys

No. 756,012.                                                    Patented March 29, 1904.

UNITED STATES PATENT OFFICE.

WILLIAM T. FOGAL, OF EMSWORTH, PENNSYLVANIA.

PASTEURIZER.

SPECIFICATION forming part of Letters Patent No. 756,012, dated March 29, 1904.

Application filed June 24, 1903. Serial No. 162,834. (No model.)

*To all whom it may concern:*

Be it known that I, WILLIAM T. FOGAL, a citizen of the United States of America, residing at Emsworth, in the county of Allegheny and State of Pennsylvania, have invented certain new and useful Improvements in Pasteurizers, of which the following is a specification, reference being had therein to the accompanying drawings.

This invention relates to certain new and useful improvements in pasteurizers, and has for its object the provision of novel means whereby milk or any liquid may be heated to a desired temperature whereby to effectually remove animal heat, germs, or other foreign matter therefrom.

Another object of my invention is to provide an apparatus in connection with a heater or burner, said apparatus being of such construction as to cause the milk or liquid to travel around the same and during its travel be heated to such a degree as the same will be purified from all foreign matter.

Briefly described, my invention comprises a double cone-shaped casing having a spiral path upon its exterior surface into which the liquid is fed from a suitable reservoir, a water-supply in connection with said double cone-shaped casing, and a burner disposed underneath the casing whereby the water carried within said casing may be heated and said heated water being in such a position within the casing as the milk which passes around the same may be heated to any desired degree of temperature.

In describing the invention in detail reference is had to the accompanying drawings, forming a part of this specification, and wherein like numerals of reference indicate like parts throughout both views, in which—

Figure 1:
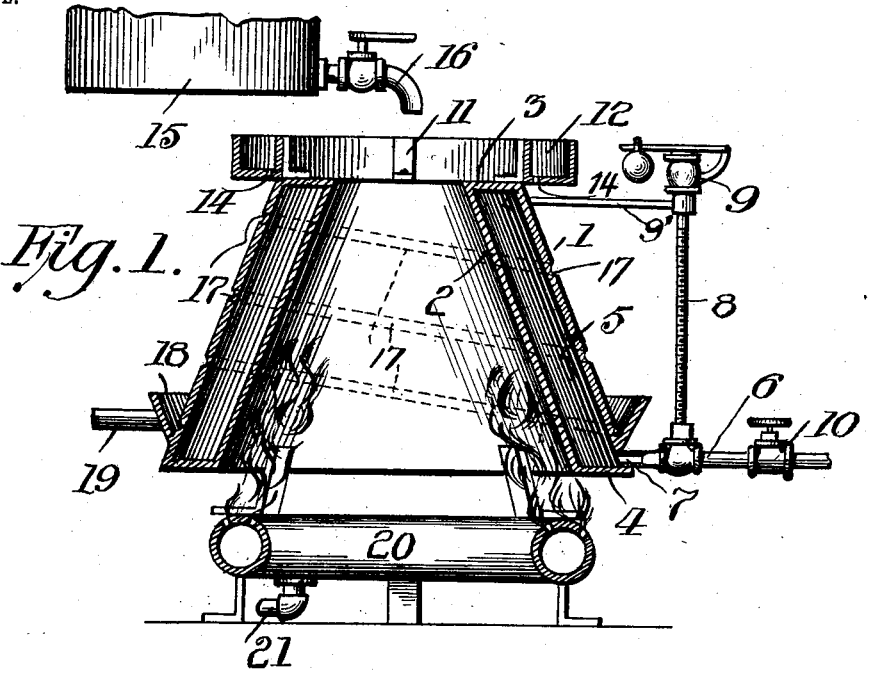
Figure 2:
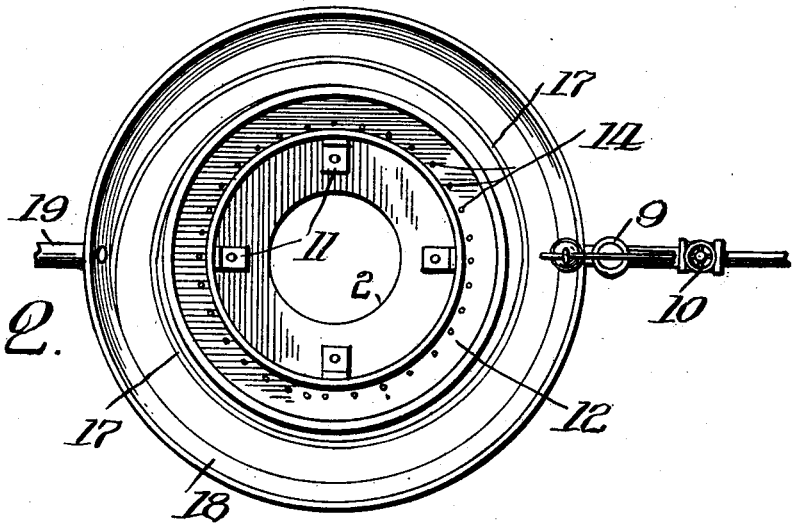

Figure 1 is a longitudinal sectional view of my improved pasteurizer. Fig. 2 is a top plan view thereof.

To put my invention into practice, I provide a casing substantially in the form of a frustated cone and comprising an outer wall 1 and an inner wall 2, which walls are connected at the top by a web 3 and at the lower ends by a web or base 4. The walls are spaced apart, so as to form the water-chamber 5 between the same, to which chamber water is fed through a supply-pipe 6, suitably connected to the casing, as at 7. The flow of water through the pipe 6 is controlled by a cock 10 in said pipe, and connected to the pipe and communicating therewith is a graduated tube 8, forming a gage to indicate the height of the water in the chamber 5. The graduated tube 8 has a safety-valve 9 on its upper end, and communication is established with the valve and the chamber 5 at the top of the latter by means of a pipe 9', which will permit of the escape of excess steam that may be generated in the upper port of water-chamber 5. On the top of the casing I secure in any desirable manner—as, for instance, by angle-irons 11—a circular or annular receiving-receptacle 12, provided in its base near the inner edge with apertures 14, through which the milk or other liquid feeds through onto the exterior of the casing. Located above said receptacle in any desired manner is a suitable receptacle or tank 15, the faucet 16 of which feeds the liquid from the receptacle into the annular receiving-receptacle 12. The flow of the liquid from the tank 15 is controlled by a cock in the faucet 16. The outer shell 1 of the casing is provided in its outer face with a spiral groove or way 17, which receives the liquid from the receptacle 12 and causes said liquid to travel in a spiral path as it descends the casing, and the latter is provided near its base with an annular trough 18 to receive the liquid, and from which trough it is conducted through an outlet 19 to any suitable receptacle. (Not shown.) Disposed underneath the casing and preferably connected thereto is a gas-burner 20, having the supply-pipe 21 in communication therewith. This burner is preferably of a circular form and of a diameter less than the base of the casing, so that the flames from the burner will strike the inclined sides of the inner shell or wall and heat the water contained in the water-chamber 5. The supply of milk or other liquid fed to the pasteurizer may be governed by the cock in faucet 16 and also by providing more or less openings 14, as well as by increasing or decreasing the size of these openings 14. The provision of the graduated tube 8 enables me to determine at a glance the height of the water in chamber 5, while steam which may be generated in the chamber 5 will be carried off through pipe 9' and safety-valve 9, so that any increase in pressure either of water or steam above normal may be relieved. To accomplish this end, the weight of the safety-valve is set so that the valve will exhaust when too much steam is contained in the chamber or when the water rises above normal. It will be evident that I may employ any suitable burner; but I preferably place the same so that the flames will strike the inner face of the inner shell or wall 2.

While I have herein shown and described a practical embodiment of my invention, yet it will be evident that in practice various changes may be made in the details of construction without departing from the general spirit of the invention.

Having fully described my invention, what I claim as new, and desire to secure by Letters Patent, is—

1. In a device of the character described, a double-walled casing of substantially frustated cone shape provided on its exterior with a spiral groove or way, an annular trough carried by the casing near its base to receive the liquid carried thereto by the spiral groove or way, said trough provided with an outlet, a water-supply pipe in communication with the space between the walls of the casing, a gage connected to said water-supply pipe to indicate the water-level in the space between the casing-walls, a safety-valve carried by said gage, an annular liquid-receiving receptacle supported on the top of the casing and provided with apertures through which the liquid is fed to the exterior wall of the casing, and a heater disposed underneath the casing to heat the water in the space between the walls of the casing, as and for the purpose described.

2. In a pasteurizer, the combination with a heater embodying a burner, of a double-wall casing supported above the burner and provided on its exterior with a spiral way or groove, a water-supply pipe communicating with the space between the walls of the casing, an indicating-gage connected to the water-supply pipe, an annular trough carried by the casing near its base, and provided with an outlet, said trough receiving the liquid from the spiral way or groove, and an annular liquid-receiving receptacle supported on top of the casing and provided with circumferentially-arranged openings through which the liquid is fed to the spiral way or groove in the exterior of the casing, substantially as described.

3. In a pasteurizer, the combination with a heater, of a double-wall casing of substantially frustated cone shape provided with a spiral groove or way in its exterior wall, a trough carried by the casing near its lower end and provided with an outlet, a water-supply pipe communicating with the space between the walls, an indicating-gage connected to the water-supply pipe, a safety-valve on said gage, a pipe communicating with said valve and with the space between the walls to carry off the steam generated in said space, and a liquid-receiving receptacle on top of the casing into which liquid is fed, said receptacle having openings in its base through which the liquid is fed to the exterior of the casing, substantially as described.

In testimony whereof I affix my signature in the presence of two witnesses.

WILLIAM T. FOGAL.

Witnesses:
E. J. BECHDEL,
K. H. BUTLER.